United States Patent
Bertolami et al.

(10) Patent No.: US 7,884,823 B2
(45) Date of Patent: Feb. 8, 2011

(54) THREE DIMENSIONAL RENDERING OF DISPLAY INFORMATION USING VIEWER EYE COORDINATES

(75) Inventors: Joe Bertolami, Redmond, WA (US); Robert M. Craig, Bellevue, WA (US); Dax Hawkins, Kirkland, WA (US); Sing Bing Kang, Redmond, WA (US); Jonathan E. Lange, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 884 days.

(21) Appl. No.: 11/761,604

(22) Filed: Jun. 12, 2007

(65) Prior Publication Data

US 2008/0309660 A1  Dec. 18, 2008

(51) Int. Cl.
*G06T 15/20* (2006.01)
*G06T 15/00* (2006.01)

(52) U.S. Cl. ...................... 345/427; 345/419
(58) Field of Classification Search ................ None
See application file for complete search history.

(56) References Cited

U.S. PATENT DOCUMENTS

| | | | |
|---|---|---|---|
| 5,717,415 A | 2/1998 | Iue et al. | 345/8 |
| 6,295,070 B1 | 9/2001 | Wood | 345/430 |
| 6,384,859 B1 | 5/2002 | Matsumoto et al. | 348/43 |
| 6,434,278 B1 | 8/2002 | Hashimoto | 382/285 |
| 6,496,598 B1 | 12/2002 | Harman | 382/154 |
| 6,924,833 B1* | 8/2005 | McDowall et al. | 348/42 |
| 7,116,335 B2 | 10/2006 | Pearce et al. | 345/587 |
| 7,382,374 B2* | 6/2008 | Majer et al. | 345/473 |
| 7,666,096 B2* | 2/2010 | Novelo | 463/30 |
| 2003/0146973 A1 | 8/2003 | Swift et al. | 348/51 |
| 2003/0216175 A1* | 11/2003 | Osako et al. | 463/31 |
| 2005/0099414 A1* | 5/2005 | Kaye et al. | 345/419 |
| 2005/0243085 A1 | 11/2005 | Schechter et al. | 345/419 |
| 2006/0012675 A1 | 1/2006 | Alpaslan et al. | 348/51 |
| 2007/0008313 A1 | 1/2007 | Song et al. | 345/419 |

FOREIGN PATENT DOCUMENTS

WO  WO 2006/071006 A1  7/2006

OTHER PUBLICATIONS

Fehn, C. et al., "An Evolutionary and Optimised Approach on 3-D TV", http://www.cs.unc.edu, 8 pages, 2002.
LaMothe, A., "3D Game Programming with a Virtual Computer", 2007 Pearson Education, http://www.samspublishing.com/articles, 7 pages.
"ImageDIG/2D/3D Digitizing Software", pp. 2002-2005 ©, http://www.imagedig.com, 2 pages.
"Virtual FX 3D Converter", VFX 2D to 3D Converter: Watch Movies or TV in Real 3D, 2002-2007 ©, http://www.i-glassesstore.com/converter.html, 3 pages.

* cited by examiner

*Primary Examiner*—Daniel F Hajnik
(74) *Attorney, Agent, or Firm*—Woodcock Washburn LLP (57) ABSTRACT

Game data is rendered in three dimensions in the GPU of a game console. A left camera view and a right camera view are generated from a single camera view. The left and right camera positions are derived as an offset from a default camera. The focal distance of the left and right cameras is infinity. A game developer does not have to encode dual images into a specific hardware format. When a viewer sees the two slightly offset images, the user's brain combines the two offset images into a single 3D image to give the illusion that objects either pop out from or recede into the display screen. In another embodiment, individual, private video is rendered, on a single display screen, for different viewers. Rather than rendering two similar offset images, two completely different images are rendered allowing each player to view only one of the images.

20 Claims, 6 Drawing Sheets

FIGURE 1

*PRIOR ART*

THREE DIMENSIONAL RENDERING OF DISPLAY INFORMATION USING VIEWER EYE COORDINATES

TECHNICAL FIELD

The technical field relates generally to computer processing and more specifically to rendering display information in three dimensions.

BACKGROUND

Often touted as the holy-grail of gaming, three dimensional (3D) gaming has not yet reached the commercial success desired by many game developers and suppliers. There are several problems associated with 3D gaming. 3D displays for the home market are not readily available. Typical displays are single-purpose, in that a display is configured either for two-dimensional (2D) rendering or 3D rendering, but not both. Displays configured to render in both 2D and 3D are typically prohibitively expensive. Further, very little 3D game content exists. Content producers typically do not want to invest in a new technology until the technology is proven and consumers typically do not want to invest in the technology if there is limited content available. Additionally, true 3D content requires multiple cameras to film objects from different viewpoints.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

Three-dimensional (3D) content for video games and related applications is rendered on a console utilizing existing hardware technology. No new display technology need be developed. Software/game developers can incorporate 3D capability into their video games with minimal work. 3D capabilities also are utilized to provide private multiple views wherein one viewer can not see another viewer's content.

In an example configuration, video games are rendered using multiple camera views. The multiple views are generated within the rendering engine. Thus, software/game developers are not required to encode dual images into a specific hardware format. Content from a single (default) camera perspective is provided to the engine and first and second camera viewpoints are generated therefrom. The first and second camera viewpoints are slightly offset from the default camera viewpoint. When a viewer sees the two slightly offset images, the user's brain combines the two offset images into a single 3D image to give the illusion that objects either pop out from or recede into the display screen. In an example embodiment, two camera views, a right camera view and a left camera view, are generated from a default camera view. The left camera view is generated by subtracting an offset from the default camera view and the right camera view is generated by adding an offset to the default camera view. The camera view perceived by a viewer is between the left and right camera views.

In another example configuration, individual, private video is rendered, on a single display screen, for different viewers. Rather than rendering two similar offset images for a single 3D image, two completely different images are rendered allowing each player to view only one of two 2D (two dimensional) images. Thus, viewers can view a full screen display rather than a split screen display. This technique can be expanded to accommodate any number of viewers. Utilizing this technique, multiple players can view various aspects of a common game and/or completely different games. In various implementations, the individual video is temporally multiplexed, spatially multiplexed, or a combination thereof.

BRIEF DESCRIPTION OF THE DRAWINGS

The foregoing summary, as well as the following detailed description, is better understood when read in conjunction with the appended drawings. For the purpose of illustrating rendering display information in three dimensions, there is shown in the drawings exemplary constructions thereof, however, rendering display information in three dimensions is not limited to the specific methods and instrumentalities disclosed.

DETAILED DESCRIPTION OF ILLUSTRATIVE EMBODIMENTS

In an example embodiment, three-dimensional (3D) rendering of content, such as video game content, is performed by a graphics processing unit (GPU) rather than a central processing unit (CPU). This allows a software/game developer to easily generate software that can be rendered in 3D. In the case of game applications, the 3D rendering is performed on the game console, such as for example, an XBOX® game console. The software/game developer is not required to generate software specifically designed for 3D rendering. The developer can generate software that calls an API (application programming interface) that performs the transformation into 3D renderable display information, thus enabling a stereoscopic render state. The software/game developer is insulated from the task of rendering two separate views, encoding dual images into a specific hardware format, and rendering this view to the display's encoding format. The software/game is insulated from the addition of the second camera, the calibration of that camera, the generation of two scenes, and the encoding format for the display. However, the software/game developer is provided control over which scenes are rendered in 3D and which are not. Thus, the software/game developer can turn on a 3D mode state, of the like, providing an indication that content is to be rendered in 3D on a frame by frame basis.

In example embodiments, utilization of the 3D rendering technique described herein can provide rendering of an entire game, or application, in 3D or rendering of selected portions of a game, or application, in 3D. Further, utilization of the herein described 3D rendering technique allows multiple viewers to view different rendered display information, wherein one viewer can not view another viewer's display information. The 3D rendering technique can be utilized with any appropriate display device, such as a monitor, a television, or the like. In an example embodiment, the 3D rendering technique is utilized with goggles, or the like, to provide temporal multiplexing.

Three dimensional (3D) displays incorporate two images, a left image and a right image corresponding to each eye of a viewer. A game, also referred to as a title, produces a single image comprising the two separate images. To generate a 3D image, a scene from the two cameras, left (L), and right (R) is rendered. In an example embodiment, the 3D rendering is performed by the GPU of a processor, such as an XBOX® game console for example. Thus, the CPU of the processor does not have to recalculate, for each rendered pass, game play, audio, physics, etc. The L and R camera positions are derived as an offset from a default camera. The camera positions and angles are adjustable to achieve a desired 3D effect. Once the two scenes are rendered and captured, they are processed by the GPU for a final render pass. This pass is processed at a chosen resolution and does the encoding of the textures to the desired encoding format of the display.

Figure 1:
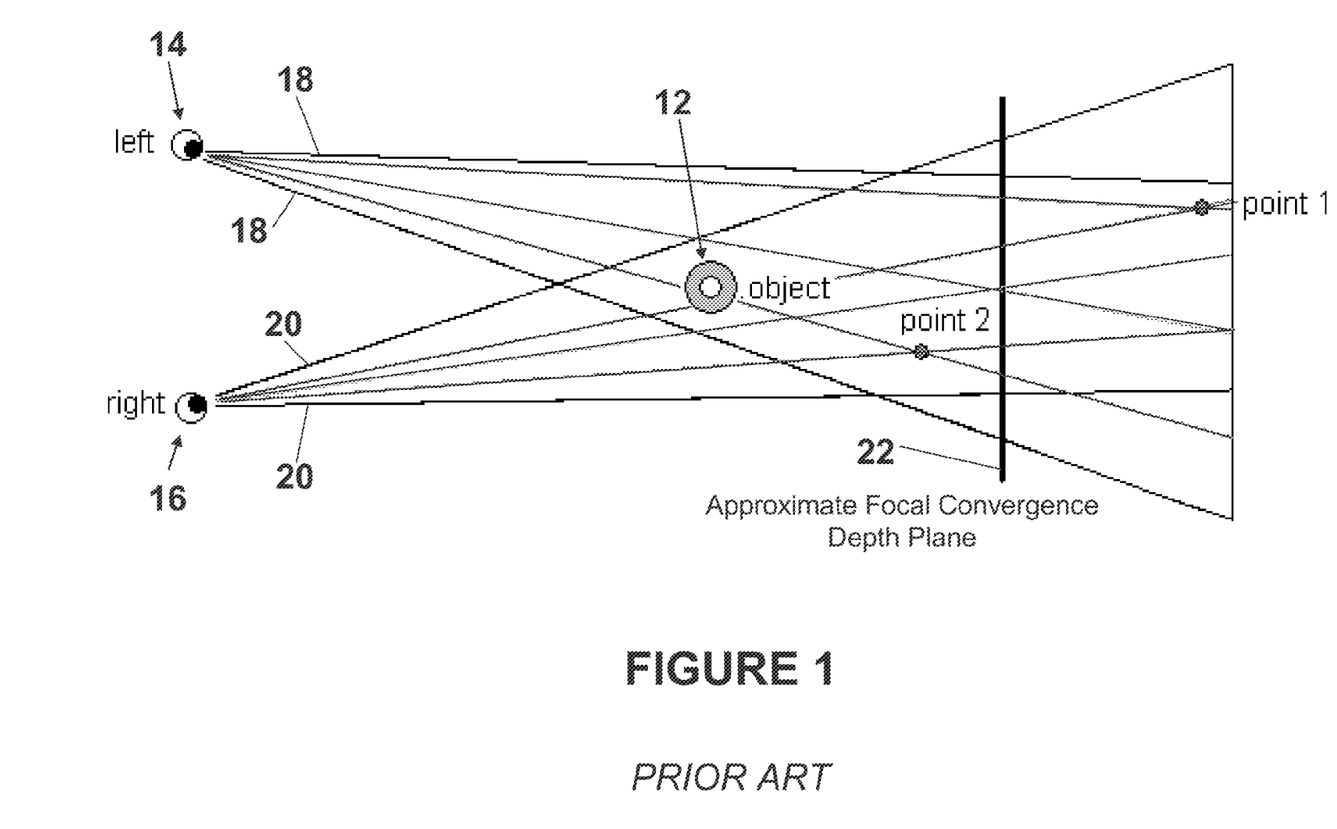
FIG. 1 is a diagram depicting an example top-down view of a classically rendered stereo scene.

FIG. 1 is a diagram depicting an example top-down view of a classically rendered stereo scene comprising object 12, point 1, and point 2. The surface in space where both cameras 14, 16 are focused is called the horopter. The horopter is a curved surface. In an example configuration, the horopter of cameras 14 and 16 is approximated with the approximate focal convergence depth plane 22. The approximate focal convergence depth plane 22 is the approximate depth value at objects transition to/from negative and positive parallax. The approximate focal convergence depth plane 22 is an approximation because the focal planes of each camera are slightly different. The plane of each camera is perpendicular to a respective camera view direction, thus the two focal planes cross in a semi-x fashion, on the focal convergence point, which rests on the focal convergence depth plane. Lines 18 and 20 outline the shape of the camera frustums for cameras 14 and 16, respectively. The lines within each outlined frustum represent possible lines of sight for each camera 14, 16. The cameras 14, 16, are slightly skewed with their centers of focus occupying the same coordinate on the focal plane 22. The overlapping nature of the camera frustums is an additional indication of their skewed nature.

Point 1 is located behind the focal plane 22 (farther from the cameras 14, 16) while point 2 is located in front of the focal plane 22 (closer to the cameras 14, 16). If the focal plane 22 is mapped directly to the display of a processor or the like, as is customary in most implementations, objects in front of the focal plane 22 are in negative parallax space and will appear to pop out of the display. Likewise, objects behind the focal plane 22 are in positive parallax space and will appear behind the display. Objects that are coincident with the focal plane 22 are said to have zero parallax and appear to coincide with the display.

Figure 2:
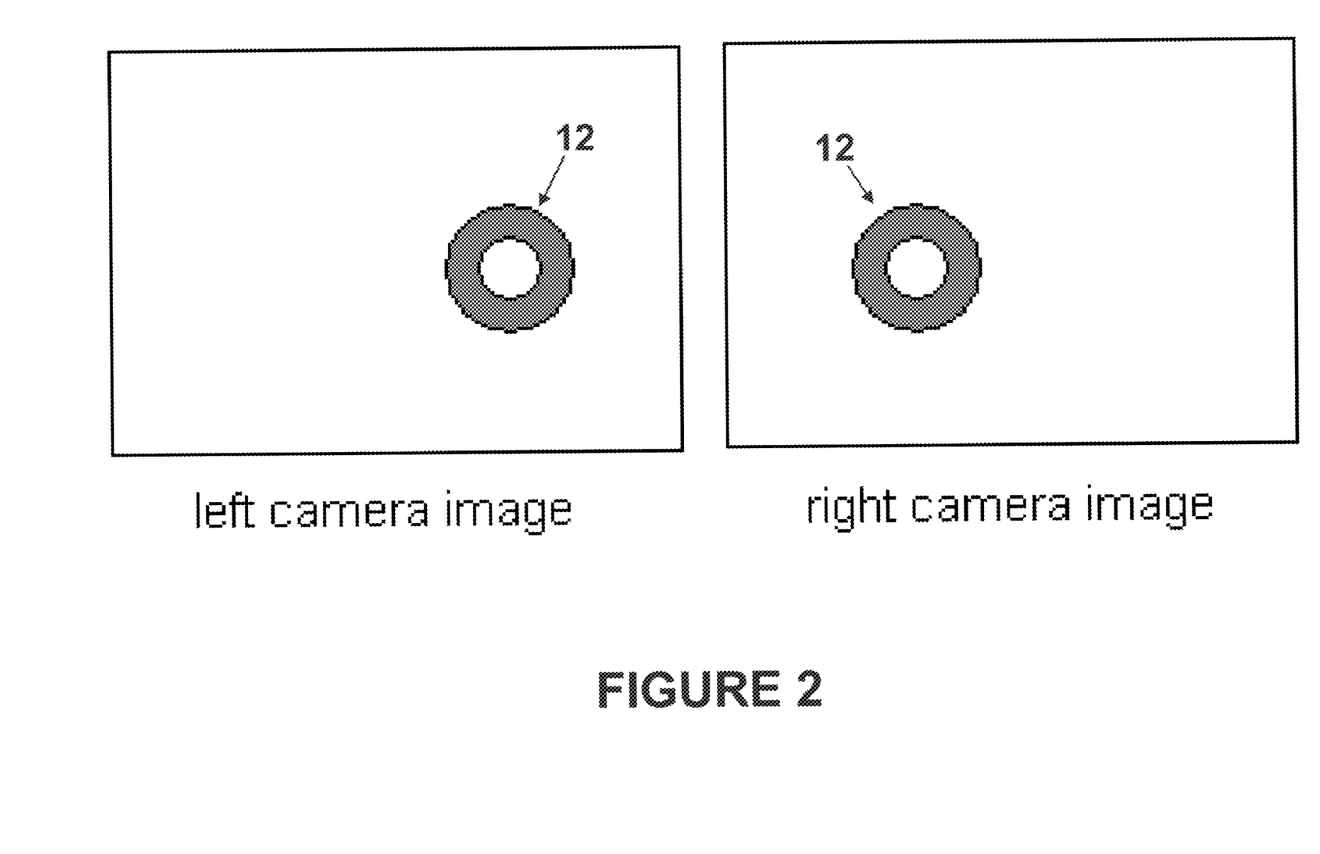
FIG. 2 illustrates a stereo image rendered from the two cameras.

The parallax space of a camera dictates its relative representation in camera space. For example, objects in positive parallax space will have a lower screen space x coordinate value when viewed by the left camera and a higher x coordinate when viewed by the right camera. Objects that have zero parallax will occupy the same screen space coordinates for both cameras. This effect does not produce geometrically accurate results. As a consequence of the varying viewpoints, objects appear spatially shifted between any pair of stereo images. As shown in FIG. 2, which illustrates a stereo image rendered from the two cameras 14 and 16, the object 12 is shifted to the right in the left camera image, and to the left in the right camera image. If the two images depicted in FIG. 2 were superimposed on top of one another, they would produce a 3D effect in negative parallax space. This means that the donut would appear to pop out of the screen at viewers.

One of the problems with this model of stereoscopic calibration is that objects only appear clearly visible if they are close to the focal plane and thus demonstrate unexaggerated levels of stereoscopic separation. The skewing of cameras enforces a focal range upon viewers, and makes it difficult to focus on (increasingly hyper-stereo) objects that fall outside of this range. Thus very close or very distant objects become a great deal harder to view.

Another shortcoming of the classic approach depicted in FIG. 1 is that it focuses on being geometrically accurate, without being physically accurate. That is, the approach does not correlate the configuration of the virtual cameras to the real world. The 3D rendering approach in accordance with the present invention, on the other hand, attempts to accurately map the separation of a viewer's eyes, in the real world, to the separation of the virtual cameras in the game world. By removing inconsistencies in the viewing configuration of the cameras, the viewer is guaranteed to receive stereo images that are physically accurate that place no greater strain on the eyes than viewing 3D objects in the real world.

Figure 3:
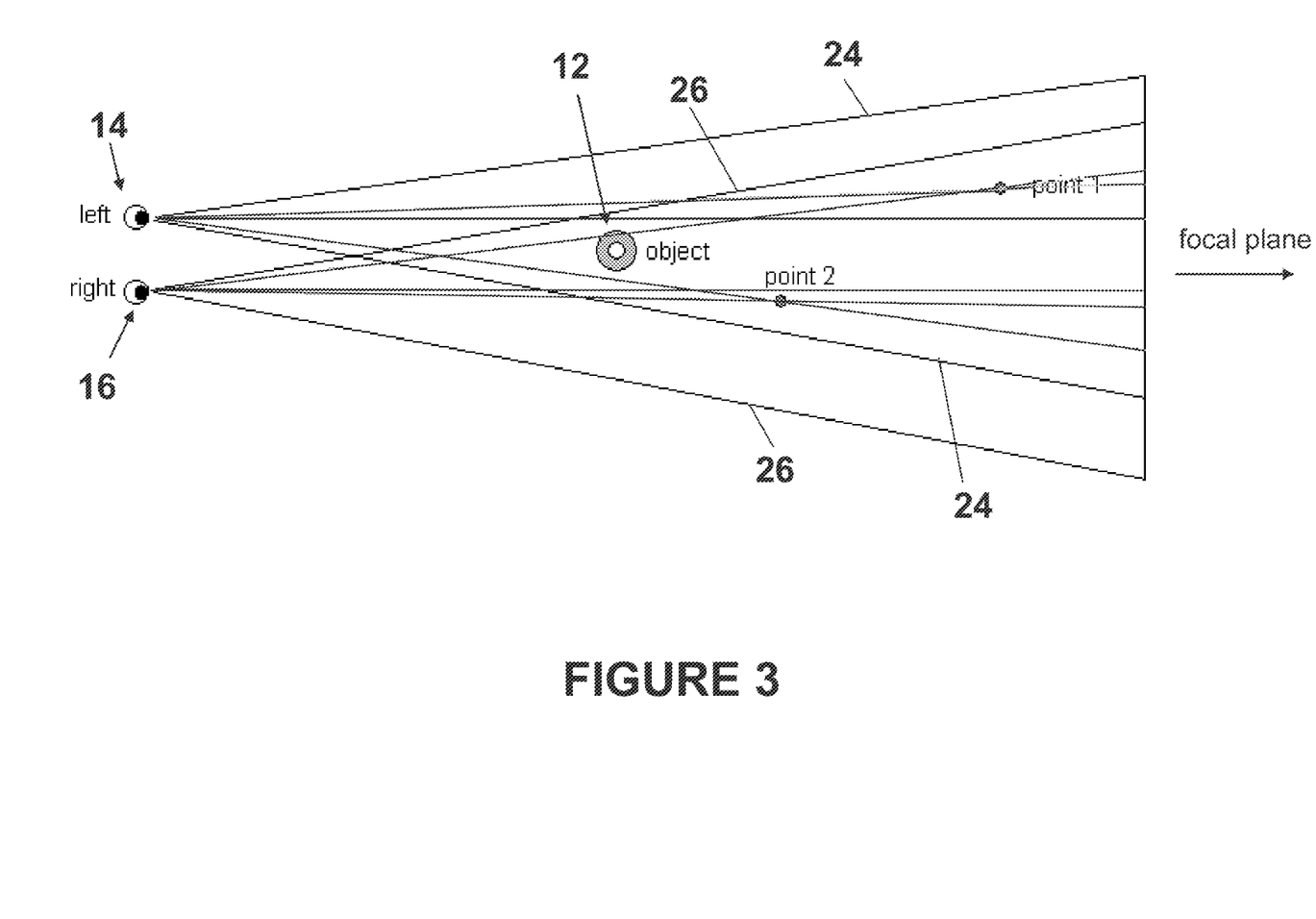
FIG. 3 is a diagram depicting an example top-down view of a rendered stereo scene wherein the cameras are in a parallel configuration.

FIG. 3 is a diagram depicting an example top-down view of a rendered stereo scene comprising object 12, point 1, and point 2, wherein the cameras 14 and 16 are in a parallel configuration. Lines 24 and 26 outline the shape of the camera frustums for parallel configured cameras 14 and 16, respectively. The lines within each outlined frustum represent possible lines of sight for each camera 14, 16. A para-perspective model is utilized for cameras 14, 16. A projection flat plane (e.g., near clipping plane, or the screen/display) is defined, such that everything past the flat plane (e.g., through the screen) is orthographically projected onto the flat plane, and the image on the flat plane is subsequently viewed perspective.

In gaming scenarios, enforcing a specific (finite) focal plane distance is unacceptable because a viewer becomes constrained and unable to choose where she wants to focus at all times. Objects in the scene that are closer to the focal plane will always appear more crisp, more in focus, and easier to view than objects farther away. In accordance with the 3D rendering technique of the present invention, a parallel camera configuration is utilized, wherein, as depicted in FIG. 3, the cameras converge at infinity. This forces the entire game world to constantly be in focus, and mitigates fatigue of a viewer's eye. Thus, the primary focal plane is located at a distance of infinity and all rendered objects exist in the negative parallax space. Accordingly, a viewer can focus on any object in the world, effectively allowing her to determine, at will, where to place the focal plane. Thus the positive and negative parallax spaces are constantly changing as the user focuses at variable distances into the virtual world, which mimics real world ocular operation and stereopsis. For example, a way to conceptualize this mechanism is for one to hold up a finger a few inches in front of one's nose, with a specific object of interest (for example a chair) along the same line of sight as the finger, but further away. When one focuses on the finger and closes the left eye, one notices that the object of interest in the background, as viewed from the open (right) eye, is shifted to the right. That is, the right eye "sees" the object of interest in positive parallax because the focal plane is at the finger. Next, one can re-focus now on the object of interest and again close the left eye. One will observe that the right eye perceives the finger in negative parallax, and that the right eye correctly sees the finger as shifted to the left.

To achieve 3D rendering in accordance with the present invention, a mapping is created of real world coordinates to virtual game coordinates. Although this description is in the context of a game, it is to be understood that 3D rendering as described herein is applicable to any appropriate application. The mapping of real world coordinates to virtual game coordinates allows the determination of the relative distance between virtual cameras based on the average distance between a person's eyes. Eye coordinates are mapped directly into screen space, and ultimately into the game's world space coordinate system, and refined to take the viewer's distance from the display screen into account. This mapping is described with reference to a vertex transformation processing pipeline.

Figure 4:
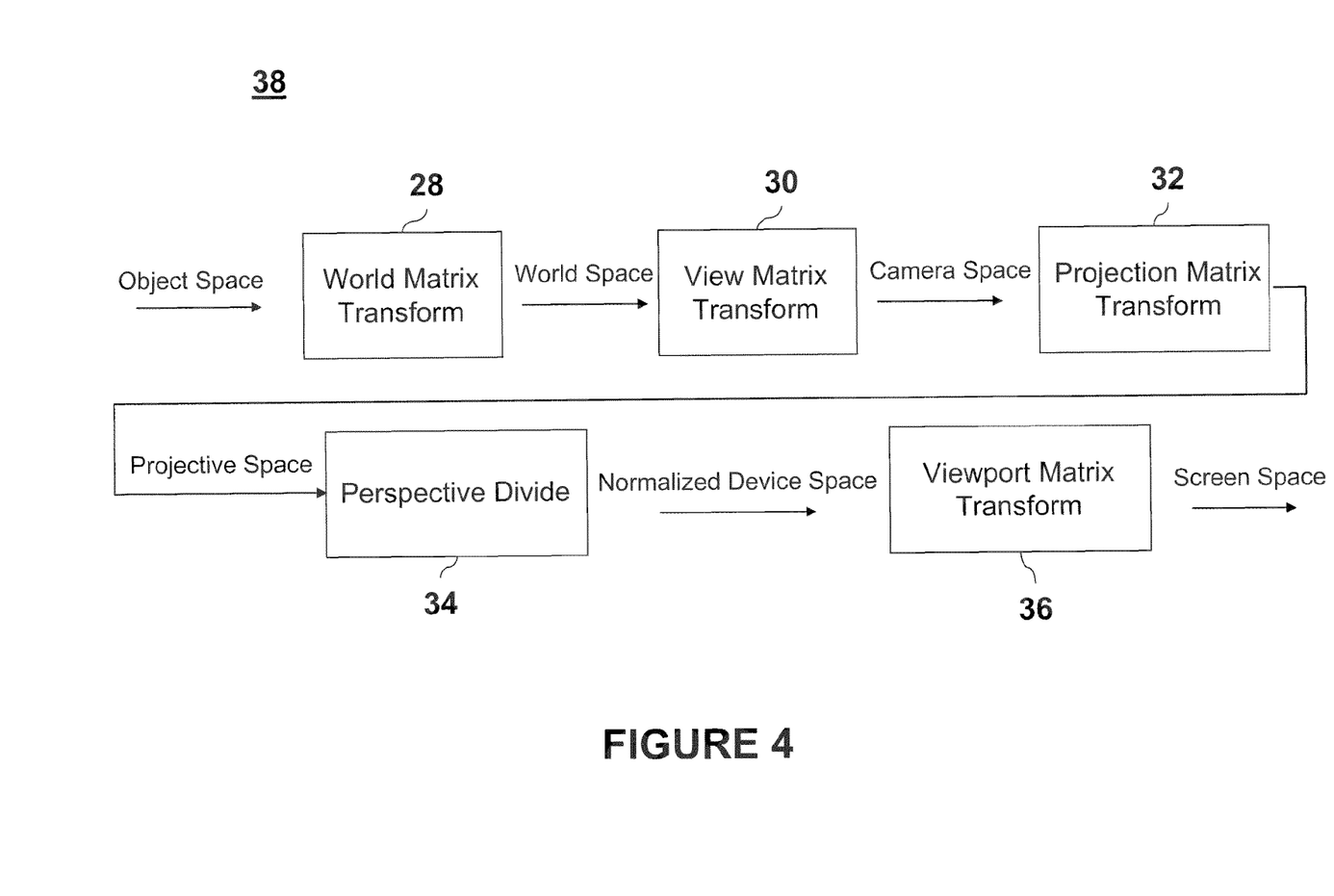
FIG. 4 is a functional block diagram of an example vertex transformation processing pipeline.

FIG. 4 is a functional block diagram of an example vertex transformation processing pipeline 38 comprising a world matrix transformation block 28, a view matrix transformation block 30, a projection matrix transformation block 32, a perspective divide block 34, and a viewport matrix transformation block 36. Functions of the vertex transformation pipeline 38 will be described and then the vertex transformation pipeline 38 will be traversed in reverse order to describe how real world coordinates are mapped to virtual game coordinates in accordance with an embodiment of the present invention.

The ultimate goal is to transform what is seen by a virtual 3D camera, into a 2D representation with apparent depth. Vertices begin in object space, which is centered about the origin, as modeled in an art tool, or the like. Upon transformation by the world matrix block 28, the vertices now exist in the world coordinate system of a game (or any appropriate application). The world matrix transformation allows a single model to be created relative to the origin, but placed at several different locations throughout the game world. Next, vertices are transformed by the view matrix block 30, which orients the vertices about a particular location and direction in 3D space corresponding to an in-game camera. As a result, all vertices are transformed such that they are visible to a camera seated at the origin, looking down the (negative or positive) z-axis. This space is referred to as the view (or camera) space, because it orients the world relative to an arbitrary camera orientation.

The projection matrix block 32 transforms vertices from camera space into projection space. Projection space is defined as a coordinate system spanning from −w to +w in the x and y directions, and either 0 to +w or 0 to −w in the z direction. Conceptually this matrix transforms a viewing frustum from camera space into an unnormalized coordinate system such that the near viewing plane maps to the front face of the projection space, and the far viewing plane maps to the back face of the projection space.

The perspective divide block 34 performs a division operation. When vertices of the form [x, y, z, 1] are multiplied by the projection matrix transform block 32, they are transformed into the form of [x', y', z', w], and are not normalized. In order to normalize these coordinates (and produce a sense of geometric depth), all coordinates are divided by w. This operation yields a coordinate of the form [x'/w, y'/w, z'/w, 1]. At this point, the vertices are in normalized device space which spans from −1 to +1 in the x and y directions, and 0 to +1 or 0 to −1 in the z direction. Vertices can now be clipped because the coordinate system is normalized, and a perspective sense has been added by effectively shrinking objects as they approach the far viewing plane. The final step in the pipeline vertex transformation processing pipeline 38 is performed by the viewport matrix transformation block 36. A goal of the viewport matrix transformation block 36 is to take vertices bounded by a unit hemi-cube (−1 to 1 in xy, 0 to +−1 in z) and map them into a screen based coordinate system (or a user defined system). This implies that vertex coordinates will range from 0 to width, and 0 to height in the xy, and from 0 to 1 in the z (for depth operations).

As mentioned above, in accordance with an example embodiment of the present invention, eye coordinates are mapped directly into screen space, and ultimately into the game's world space coordinate system, and refined to take the viewer's distance from the display screen into account. This mapping allows the determination of the relative distance between virtual cameras based on the average distance between a person's eyes. Eye coordinates are mapped directly into screen space, and subsequently into the game's world space coordinate system, and refined to take into account the viewer's distance from the display screen.

In an example scenario, assume a total eye separation of 3 inches, wherein the left and right eyes are each 1.5 inches away from the center of the nose. This individual eye-to-nose distance is referred to as the eye separation distance. If we attempt to map this value directly to the display without taking viewing distance into consideration, a separation of 1.5 inches for each eye maps directly to a span of 1.5 inches on the surface of the display. Next this distance is mapped into the normalized device space of the vertex transformation processing pipeline 38 by dividing the separation distance by ½ the width of the display. Because normalized device space ranges from −1 to 1 in the x range, the normalized device separation is equal to the eye separation divided by half the display width. At this point the eye-to-nose real world distance is mapped into the virtual normalized device space. The viewport transformation block 36 is skipped because of the assumption of a standard full-screen viewport transformation.

Following the vertex transformation processing pipeline 38 backwards, this distance is transformed inversely through the perspective divide block 34 and the projection matrix transform block 32. Performing an inverse transformation, results in an offset of 0.014125 applied to the cameras in view space to achieve a physically correct calibration offset derived from the separation between the viewer's eyes. Now that the correct amount of offset to apply to the stereo cameras has been determined, each camera is translated by this amount. Because the coordinates are view space coordinates, the offset is applied as a lateral shift along the x axis in both the positive and negative directions.

Because the virtual cameras are parallel and their separation is physically based there is no need to dynamically shift the separation or perform any stereo calculations per frame. In this configuration, the game is rendering world geometry as accurately as possible with reverence to the physical dimension and unit system. As a natural consequence, this method frees the viewer from fatigue as the eye is no longer taxed or constrained to view an artificially and arbitrarily stereographic image.

Figure 5:
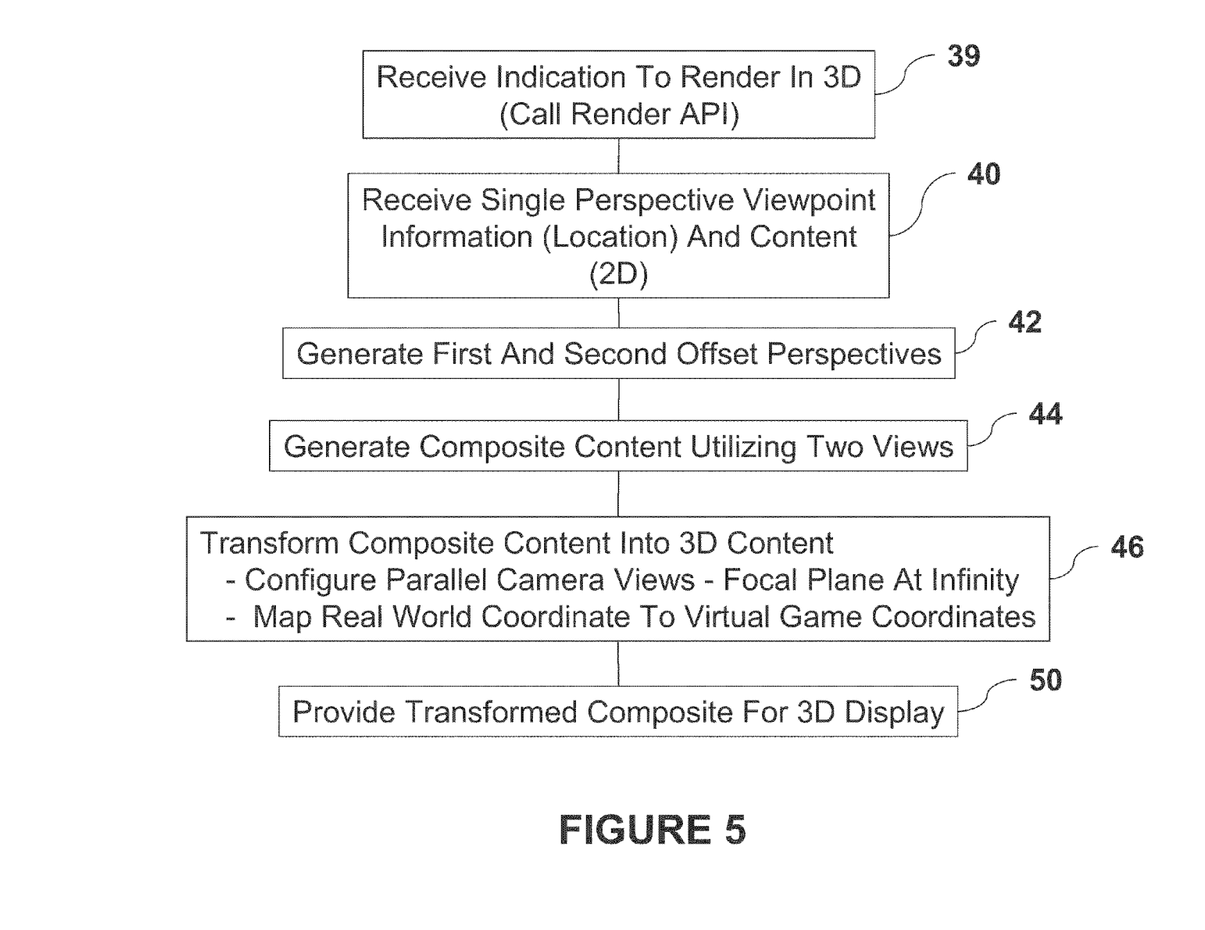
FIG. 5 is a flow diagram of an example process for rendering information in 3D.

FIG. 5 is a flow diagram of an example process for rendering information in 3D. In an example embodiment, two camera viewpoints (e.g., left and right) are generated from a default camera viewpoint. Thus default camera viewpoint is in the middle of the left and right camera viewpoints. During execution of the game, an indication to render content in 3D is received at step 39. The indication can comprise any appropriate indication, such as, for example, a call to an API for rendering content in 3D.

At step 40, a single (default) camera viewpoint and associated content are received. That is, the location of the single perspective camera viewpoint and the content associated with the single perspective camera viewpoint are received. First and second perspectives are generated at step 42. The first and second perspectives are offset from the received (default) view, as described above. In an example embodiment, the first and second perspectives represent left and right perspectives. The first and second perspectives (camera viewpoints) are slightly offset from the default camera viewpoint. The left camera viewpoint is generated by subtracting an offset from the default camera viewpoint and the right camera viewpoint is generated by adding an offset to the default camera viewpoint. Composite content is generated at step 44. The composite content comprises the two offset views. The composite content is transformed into content renderable in 3D at step 46. The transform, as described above, includes configuring the virtual cameras to comprise parallel views such that the effective focal length is infinity, and includes mapping the real world coordinates, such as the viewer's eye separation, to game world coordinates. The transformed composite content is provided for rendering in 3D at step 50.

In an example embodiment, instead of using the left and right images to produce one 3D image, the herein described 3D rendering technique also can be used to provide two unique 2D images to two people playing a game on the same screen. The display data can alternate between the left and right eyes. As an analogy, consider shutter glasses, although the same theory applies to displays that do not require glasses. The displaying of information is synchronized with the display such that a shutter for the left eye is open when the image for the left eye is on the display screen and the shutter for the right eye is open when the image for the right eye is displayed on the screen. If the images for the left and right eye are shown in rapid succession, one gets the illusion of seeing one 3D image because the brain will persist the preceding image and blend the two. Furthermore, the left eye never sees data intended for the right eye and vice versa because when the shutter for the left eye is open, the shutter for the right eye is closed. It is to be understood that the use of goggles is as an example application, and should not be limited thereto. This technique is applicable to a system that does not require goggles.

Without the goggles, a player would see both views simultaneously and could possibly see what the other player is doing. To avoid seeing the other players display data (e.g., in a game like poker), a third view is added. By adding a third view it can be ensured that a player without goggles would only see garbage. Every third frame, for example, could be 'garbage' such that someone without glasses would see player 1's (P1) image, player 2's (P2) image, and then the garbage image in rapid succession. If the images are shown fast enough, the output would be so garbled as to make screen cheating difficult. In order to "decode" the correct image for P1 and P2, the glasses would then have to shutter in a different pattern. P1's shutter pattern would be {open, closed, closed}, and P2's pattern would be {closed, open, closed}. In multiplayer scenarios, two distinct views enable two people logged in to the console to see separate dashboard settings. For example, player 1 might have a "Kameo" theme and background while player 2 has a "Gears of War" theme. Both players can see their own custom settings.

In an example embodiment, a synchronizing module, or the like, could be synchronized to the vertical blank interrupt in the console. The synchronizing module could drive the synchronization of goggles. The monitor, TV, or the like, would receive un-encoded images in sequence: left image, right image, left image, right image, etc. and the synchronization module would ensure that the glasses would shutter accordingly.

Figure 6:
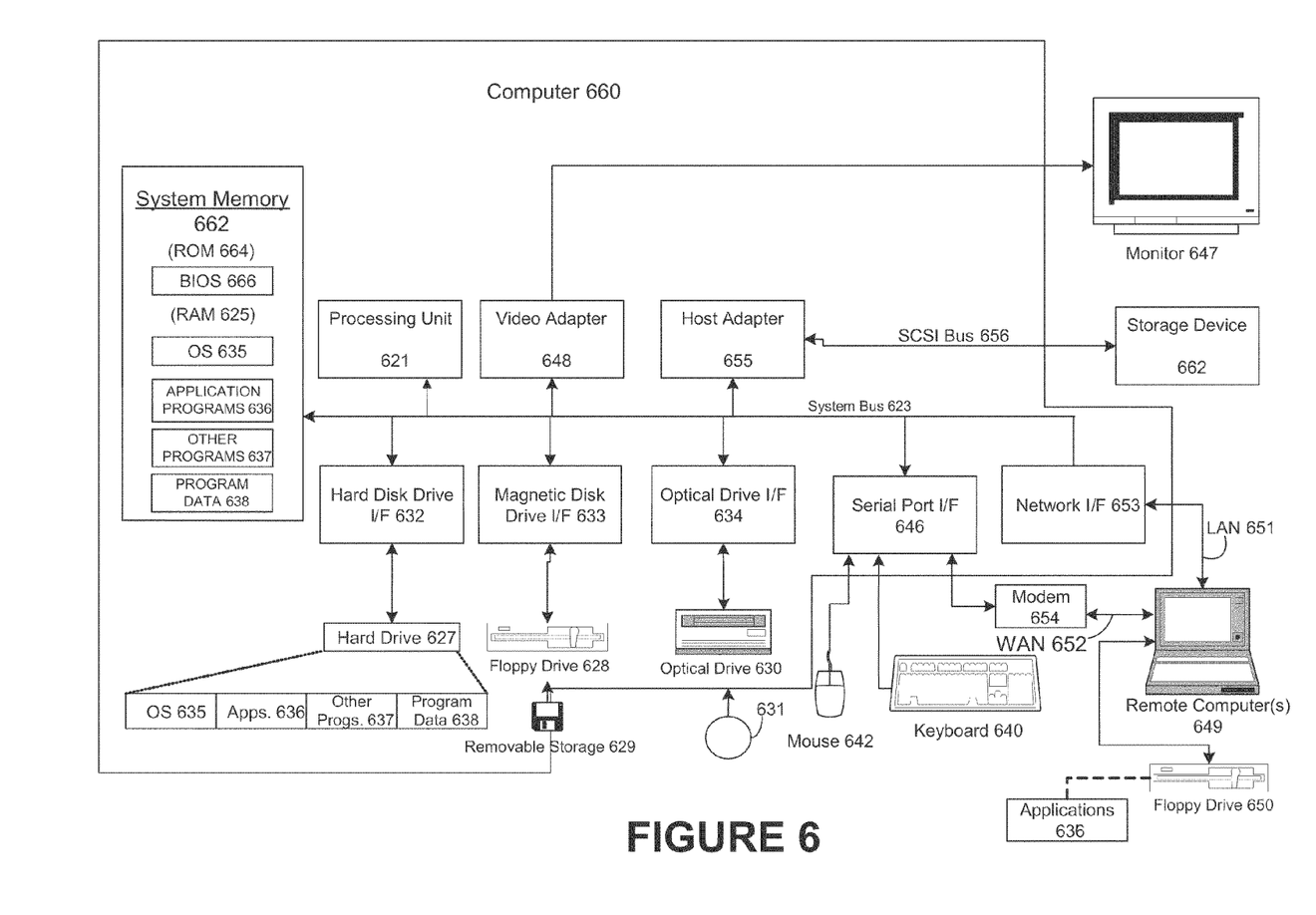
FIG. 6 is a depiction of a suitable computing environment in which rendering display information in three dimensions can be implemented.

FIG. 6 and the following discussion provide a brief general description of a suitable computing environment in which rendering display information in three dimensions can be implemented. Although not required, various aspects of rendering display information in three dimensions can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of rendering display information in three dimensions can be practiced with other computer system configurations, including hand held devices, multi processor systems, microprocessor based or programmable consumer electronics, network PCs, minicomputers, mainframe computers, and the like. Further, rendering display information in three dimensions also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 621, the memory (both ROM 664 and RAM 625), the basic input/output system (BIOS) 666, and various input/output (I/O) devices such as a keyboard 640, a mouse 662, a monitor 647, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with rendering display information in three dimensions as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain cases, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 6, an exemplary general purpose computing system includes a conventional computing device 660 or the like, including a processing unit 621, a system memory 662, and a system bus 623 that couples various system components including the system memory to the processing unit 621. The system bus 623 may be any of several types of bus structures including a memory bus or memory controller, a peripheral bus, and a local bus using any of a variety of bus architectures. The system memory includes read only memory (ROM) 664 and random access memory (RAM) 625. A basic input/output system 666 (BIOS), containing basic routines that help to transfer information between elements within the computing device 660, such as during start up, is stored in ROM 664. The computing device 660 may further include a hard disk drive 627 for reading from and writing to a hard disk (hard disk not shown), a magnetic disk drive 628 (e.g., floppy drive) for reading from or writing to a removable magnetic disk 629 (e.g., floppy disk, removal storage), and an optical disk drive 630 for reading from or writing to a removable optical disk 631 such as a CD ROM or other optical media. The hard disk drive 627, magnetic disk drive 628, and optical disk drive 630 are connected to the system bus 623 by a hard disk drive interface 632, a magnetic disk drive interface 633, and an optical drive interface 634, respectively. The drives and their associated computer readable media provide non volatile storage of computer readable instructions, data structures, program modules and other data for the computing device 660. Although the exemplary environment described herein employs a hard disk, a removable magnetic disk 629, and a removable optical disk 631, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 629, optical disk 631, ROM 664, or RAM 625, including an operating system 635, one or more application programs 636, other program modules 637, and program data 638. A user may enter commands and information into the computing device 660 through input devices such as a keyboard 640 and pointing device 662 (e.g., mouse). Other input devices (not shown) may include a microphone, joystick, game pad, satellite disk, scanner, or the like. These and other input devices are often connected to the processing unit 621 through a serial port interface 646 that is coupled to the system bus, but may be connected by other interfaces, such as a parallel port, game port, or universal serial bus (USB). A monitor 647 or other type of display device is also connected to the system bus 623 via an interface, such as a video adapter 648. In addition to the monitor 647, computing devices typically include other peripheral output devices (not shown), such as speakers and printers. The exemplary environment of FIG. 6 also includes a host adapter 655, Small Computer System Interface (SCSI) bus 656, and an external storage device 662 connected to the SCSI bus 656.

The computing device 660 may operate in a networked environment using logical connections to one or more remote computers, such as a remote computer 649. The remote computer 649 may be another computing device (e.g., personal computer), a server, a router, a network PC, a peer device, or other common network node, and typically includes many or all of the elements described above relative to the computing device 660, although only a memory storage device 650 (floppy drive) has been illustrated in FIG. 6. The logical connections depicted in FIG. 6 include a local area network (LAN) 651 and a wide area network (WAN) 652. Such networking environments are commonplace in offices, enterprise wide computer networks, intranets and the Internet.

When used in a LAN networking environment, the computing device 660 is connected to the LAN 651 through a network interface or adapter 653. When used in a WAN networking environment, the computing device 660 can include a modem 654 or other means for establishing communications over the wide area network 652, such as the Internet. The modem 654, which may be internal or external, is connected to the system bus 623 via the serial port interface 646. In a networked environment, program modules depicted relative to the computing device 660, or portions thereof, may be stored in the remote memory storage device. It will be appreciated that the network connections shown are exemplary and other means of establishing a communications link between the computers may be used.

While it is envisioned that numerous embodiments of rendering display information in three dimensions are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for rendering display information in three dimensions, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing rendering display information in three dimensions.

The program(s) can be implemented in assembly or machine language, if desired. In any case, the language can be a compiled or interpreted language, and combined with hardware implementations. The methods and apparatuses for rendering display information in three dimensions also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of rendering display information in three dimensions. Additionally, any storage techniques used in connection with rendering display information in three dimensions can invariably be a combination of hardware and software.

While rendering display information in three dimensions has been described in connection with the example embodiments of the various figures, it is to be understood that other similar embodiments can be used or modifications and additions can be made to the described embodiments for performing the same functions of rendering display information in three dimensions without deviating therefrom. Therefore, rendering display information in three dimensions as described herein should not be limited to any single embodiment, but rather should be construed in breadth and scope in accordance with the appended claims.

What is claimed is:

1. A processor-implemented method for rendering information in three dimensions, the method comprising:
   receiving, in the processor, default data indicative of an image from a default virtual camera;
   mapping coordinates of each of a first eye and a second eye of a viewer to a world space coordinate system;
   refining the mapped coordinates of the first eye and the second eye in the world space coordinate system to account for a distance of the viewer from a display device;
   using the processor to generate first data indicative of a first image from a first virtual camera located at the refined mapped coordinates of the first eye;
   using the processor to generate second data indicative of a second image from a second virtual camera located at the refined mapped coordinates of the second eye, wherein:
   a viewing angle associated with the first virtual camera is offset, in accordance with a first offset, from a viewing angle associated with the default virtual camera;
   a viewing angle associated with the second virtual camera is offset, in accordance with a second offset, from a viewing angle associated with the default virtual camera;
   a focal distance of the first virtual camera is infinity; and
   a focal distance of the second virtual camera is infinity;
   using the processor to generate a composite image comprising the first image and the second image; and
   using the processor to provide the composite image for rendering using the display device, wherein the composite image is perceivable in three dimensions.

2. A method in accordance with claim 1, wherein the first image and the second image are indicative of a video game image.

3. A method in accordance with claim 1, wherein the viewing angle associated with the first virtual camera is parallel with the viewing angle associated with the second virtual camera.

4. A method in accordance with claim 1, further comprising mapping a real world coordinate to a game coordinate to determine the first offset and the second offset.

5. A method in accordance with claim 4, wherein the real world coordinate comprises at least one of:
   a distance between eyes of a viewer of the composite image; and
   a distance between a viewer of the composite image and a display surface on which the composite image is rendered.

6. A method in accordance with claim 1, wherein:
   the first offset comprises an offset in a first direction from the viewing angle of the default virtual camera;
   the second offset comprises an offset in a second direction from the viewing angle of the default virtual camera; and
   the first direction is in an opposite direction from the second direction.

7. A method in accordance with claim 1, the information is rendered in a graphics processing unit of the processor.

8. A method in accordance with claim 1, wherein the composite image comprises two separate two dimensional images, the method further comprising toggling each of the two separate images for allowing two viewers to view a respective one of the two separate images.

9. A method in accordance with claim 1, wherein the information comprises video game information and a portion of the video game information is rendered in three dimensions.

10. An apparatus comprising:
    a memory configured to store processor-executable instructions; and
    a processor configured to receive the processor-executable instructions from the memory and to execute the processor-executable instructions to:
    map coordinates of each of a first eye and a second eye of a viewer to a world space coordinate system;
    refine the mapped coordinates to account for a distance of the viewer from a display device;
    generate, from default data indicative of a default image from a default virtual camera:
    first data indicative of a first image from a first virtual camera having a location determined as a function of the mapped coordinates of the first eye; and
    second data indicative of a second image from a second virtual camera have a location determined as a function of the mapped coordinates of the second eye, wherein:
    a viewing angle associated with the first virtual camera is offset, in accordance with a first offset, from a viewing angle associated with the default virtual camera;
    a viewing angle associated with the second virtual camera is offset, in accordance with a second offset, from a viewing angle associated with the default virtual camera;
    a focal distance of the first virtual camera is infinity; and
    a focal distance of the second virtual camera is infinity, generate a composite image comprising the first image and the second image; and render the composite image, wherein the composite image is perceivable in three dimensions.

11. An apparatus in accordance with claim 10, wherein the first image and the second image are indicative of a video game image.

12. An apparatus in accordance with claim 10, wherein the viewing angle associated with the first virtual camera is parallel with the viewing angle associated with the second virtual camera.

13. An apparatus in accordance with claim 10, further configured to map a real world coordinate to a game coordinate to determine the first offset and the second offset.

14. An apparatus in accordance with claim 13, wherein the real world coordinate comprises at least one of:
  a distance between eyes of a viewer of the composite image; and
  a distance between a viewer of the composite image and a display surface on which the composite image is rendered.

15. An apparatus in accordance with claim 10, wherein the composite image comprises two separate two dimensional images, and wherein the processor is further configured to toggle each of the two separate images for allowing two viewers to view a respective one of the two separate images.

16. An apparatus in accordance with claim 10, wherein the information comprises video game information and a portion of the video game information is rendered in three dimensions.

17. A processor-readable storage medium, wherein the storage medium is not a signal, the storage medium storing processor-executable instructions that, when executed by a processor, cause the processor to perform the steps of:
  mapping coordinates of each of a first eye and a second eye of a viewer to a world space coordinate system;
  refining the mapped coordinates to account for a distance of the viewer from a display device;
  generating, from default data indicative of a default image from a default virtual camera:
  first data indicative of a first image from a first virtual camera having a location determined as a function of the mapped coordinates of the first eye; and
  second data indicative of a second image from a second virtual camera have a location determined as a function of the mapped coordinates of the second eye, wherein:
  a viewing angle associated with the first virtual camera is offset, in accordance with a first offset, from a viewing angle associated with the default virtual camera;
  a viewing angle associated with the second virtual camera is offset, in accordance with a second offset, from a viewing angle associated with the default virtual camera;
  a focal distance of the first virtual camera is infinity; and
  a focal distance of the second virtual camera is infinity;
  generating a composite image comprising the first image and the second image; and
  rendering the composite image, wherein the composite image is perceivable in three dimensions.

18. The processor-readable storage medium of claim 17, wherein the information is indicative of video game information.

19. The processor-readable storage medium of claim 17, wherein the viewing angle associated with the first virtual camera is parallel with the viewing angle associated with the second virtual camera.

20. The processor-readable storage medium of claim 17, storing further processor-executable instructions for mapping a real world coordinate to a game coordinate to determine the first offset and the second offset.

* * * * *